Aug. 18, 1959

J. R. LUDWIG 2,899,897

TRACTOR TAKE-OFF CLUTCH

Filed July 20, 1953

INVENTOR
JOHN ROBERT LUDWIG
By Lawrence C. Wither
ATTORNEY

Aug. 18, 1959     J. R. LUDWIG     2,899,897
TRACTOR TAKE-OFF CLUTCH

Filed July 20, 1953     3 Sheets-Sheet 2

INVENTOR
JOHN ROBERT LUDWIG
BY Lawrence C. Witker
ATTORNEY

United States Patent Office 2,899,897
Patented Aug. 18, 1959

2,899,897

TRACTOR TAKE-OFF CLUTCH

John Robert Ludwig, Swanton, Ohio, assignor to Dana Corporation, Toledo, Ohio, a corporation of Virginia Application July 20, 1953, Serial No. 368,904

8 Claims. (Cl. 192—48)

This invention relates to axially engageable friction clutches of the dual or multiple type for effecting a plurality of power-take-offs and having operating mechanism for sequentially engaging and disengaging the clutches, simultaneously engaging or disengaging the clutches, and independently engaging or disengaging the clutches.

The primary object of the invention is to provide a clutch of the above character with actuating and operating mechanism so arranged that a single control lever or pedal is operable to control the engagement and disengagement of the clutches, each clutch including a driving member, friction disc, pressure plate, and spring means for urging the pressure plate into and out of engaging position under the influence of a common control mechanism capable of movement to one position to disengage one clutch and further to a final position to disengage both clutches.

Further objects and advantages of the present invention will be apparent from the following description when taken in connection with the accompanying drawings in which.

Figure 1:
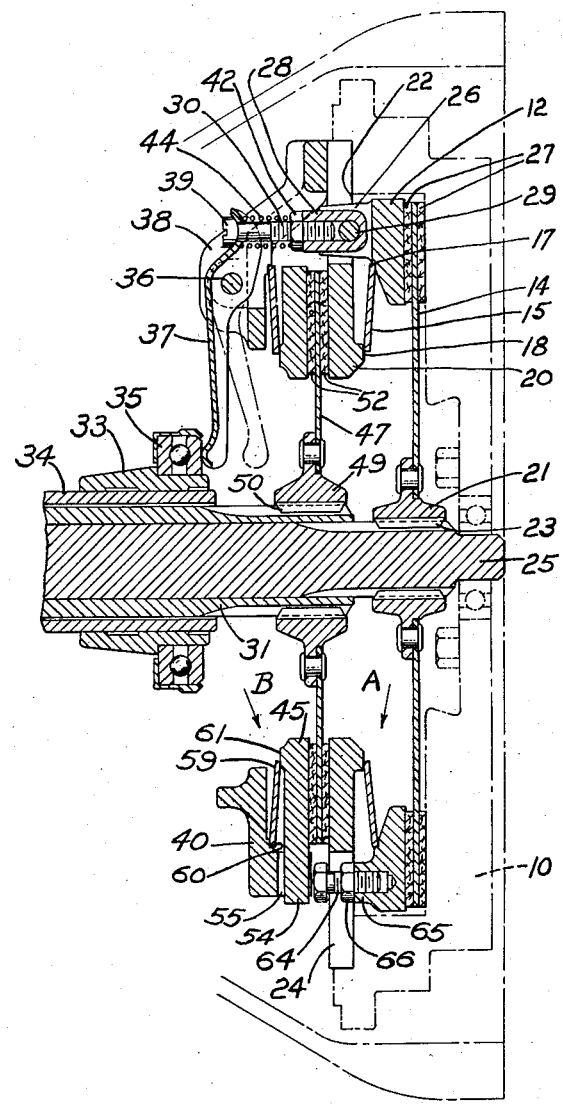
Figure 1 is an axial section view of a clutch arrangement embodying the invention.
Figure 2:
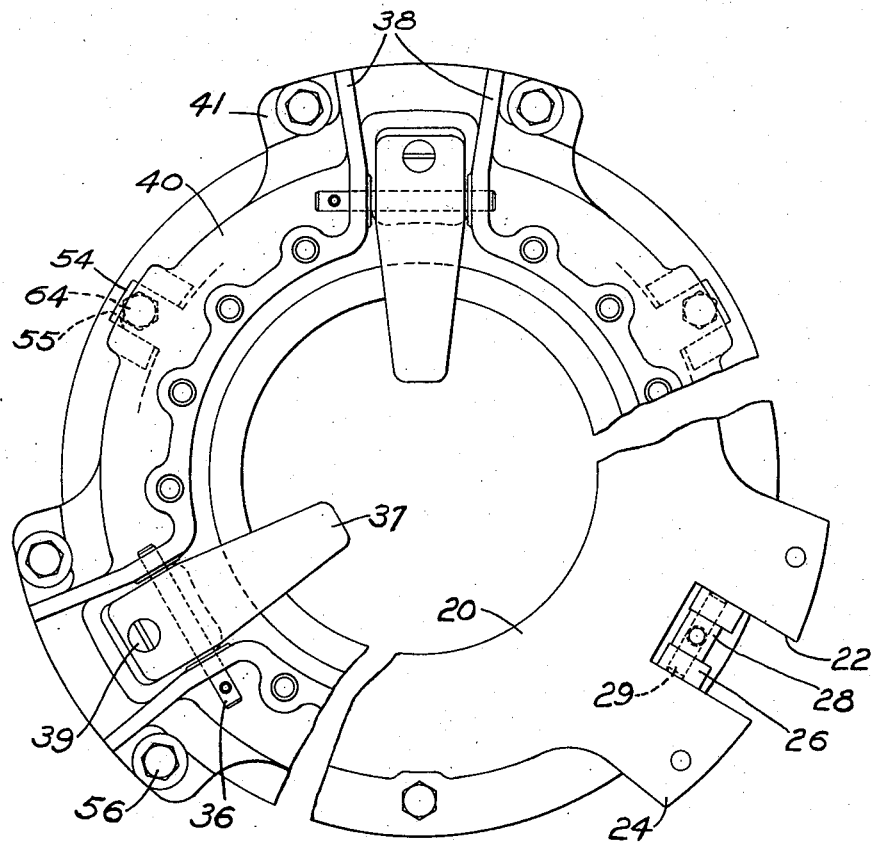
Figure 2 is fragmentary elevational view.

Referring to the drawings and in particular to Figures 1 and 2, two clutch assemblies indicated generally as A and B are adapted to be connected to a driving member 10, such as a flywheel of an engine, so that two power-take-offs may be obtained, one of which may couple the engine to the transmission of a vehicle to drive the latter, while the other may couple the engine to an output shaft to drive an accessory or supplemental equipment.

The clutch assembly A comprises a pressure plate 12 and a driven member or disc 14 adapted to be frictionally engaged between the driving member 10 and the pressure plate 12 by spring means such as the Belleville washer 15. The outer periphery of the spring washer 15 engages an annular shoulder 17 on the pressure plate 12, while the inner peripherial region of spring 15 is adapted for engagement with an annular boss 18 on an intermediate plate or abutment 20 rotatable with the driving member 10, so as to transfer the reaction load to the pressure plate 12. Spring 15 is characterized by a negative rate so that the reaction pressure afforded thereby increases rather than decreases as a result of clutch wear. Other types of low rate springs could be used.

The plate 20 is peripherally slotted as at 22 centrally of spaced projections 24, the slots 22 serving to receive driving lugs 26 on the back of pressure plate 12, which lugs 26 also serve to pivotally support as at 29 rod end members 28 of adjustable release rods 30. Torque is transmitted from flywheel 10 to pressure plate 12 thru lugs 26 to drive the driven disc 14 which has a central hub 21 splined at 23 on driven shaft 25 and a pair of friction facings 27 secured on opposite sides of the outer portion of the disc 14 between pressure plate 12 and flywheel 10.

Beyond the splined connection between driven member 14 and shaft 25 is a second driven shaft 31 of tubular cross section that is telescoped on shaft 25 for rotation therewith or independently thereof. Shaft 25 is preferably coupled to the transmission for driving the vehicle, while shaft 31 is coupled to an auxiliary device either on or adjacent the vehicle.

A clutch release sleeve 33 slidably reciprocated on an intermediate quill 34 surrounding tubular shaft 31 supports a thrust bearing 35 the inner race of which engages the radially inner portion of release levers 37. Throwout bearing 35 is movable in the usual way by means of a clutch pedal or lever (not shown). The levers 37 are pivotally supported by pins 36 between rearwardly bent flanges 38 of back plate or spider 40. The radially outer portions of levers 37 are cupped and apertured to receive the slotted head ends 39 of release rods 30.

Spider 40, like intermediate plate 20, is mounted on flywheel 10 for rotation therewith, and as more clearly shown in Fig. 2 is formed with three equally spaced legs or arms 41 each provided with pairs of flanges 38 to support a release lever 37 therebetween.

Surrounding the shank of rods 30 and interposed between the cupped ends of levers 37 and a lock or jam nut 42 bearing on rod end members 28 are springs 44. Springs 44 urge the outer ends of levers 37 into engagement with the heads 39 of rods 30. The effect of centrifugal force, which tends to cause the inner ends of lever 37 to ride the face of release bearing 35 during clutch engagement, is thereby overcome by springs 44. When the inner ends of levers 37 are moved to the right (Fig. 1) on their fulcrums, the pressure plate 12 will be moved to the left against the action of spring 15 to release the clutch member.

Clutch assembly B comprises the intermediate plate 20 functioning as the driving member due to its connection to the flywheel 10, pressure plate 45, and a driven member or disc 47. Driven member 47 includes a hub 49 splined at 50 on tubular shaft 31 and a pair of friction facings 52 attached to the peripheral region of the disc 47 between the confronting surfaces of driving plate 20 and pressure plate 45. Driving connection between pressure plate 45 and driving member or flywheel 10 is effected by means of driving lugs 54 projecting radially into slots 55 in back plate 40 in turn secured to the flywheel 10 by cap screws 56 (Fig. 2), which also secure plate 20.

A Belleville spring washer 59 is interposed between back plate 40 and pressure plate 45 to apply engaging pressure to the pressure plate. The outer periphery of the spring washer 59 engages an annular shoulder 60 on the back plate 40, while the inner peripheral region of spring 59 is adapted for engagement with an annular boss 61 on pressure plate 45. Spring 59 is similar in character to spring 15, and due to the fact that a single release collar is actuated to disengage both clutches against the pressure of the two springs, the type of spring illustrated is particularly adapted to insure low pedal pressure.

Driving lugs 54 serve also as abutments against which adjustable studs or tappets 64 apply releasing pressure to the pressure plate 45. The studs 64 are adjustably threaded into apertures in bosses 65 projecting axially from the first pressure plate 12 arranged opposite the projections 24 in reaction plate 20. Studs 64 are provided with jam or lock nuts 66 to lock the studs in position to engage the lugs 54 after a predetermined amount of disengaging movement of pressure plate 12 effected by initial movement of release levers 37. Continued movement of levers 37 to the right (Fig. 1) will engage the heads of studs 64 with lugs 54 and effect disengaging movement of pressure plate 45 against the action of spring 59. Both clutches are thus sequentially disengaged by a single set of clutch levers 37 and one throw-out mechanism 35.

By the mechanism, this far described it will be seen that clutch assembly A for coupling the engine to the transmission to drive the vehicle may be disengaged independently of clutch assembly B. By this arrangement, the auxiliary mechanism driven by tubular shaft 31 may continue to be driven, while the vehicle is at rest. Clutch A may be reengaged without having disengaged clutch B. Furthermore, further disengaging movement of a clutch pedal or lever will cause subsequent disengagement of clutch B to stop the drive to the auxiliary mechanism. With this form of the invention, also, reengaging movement of clutch pedal or lever will effect engagement of clutch B first and then clutch A in the reverse order of their disengagement. Such order of disengagement and engagement is desirable in many instances.

Figure 3:
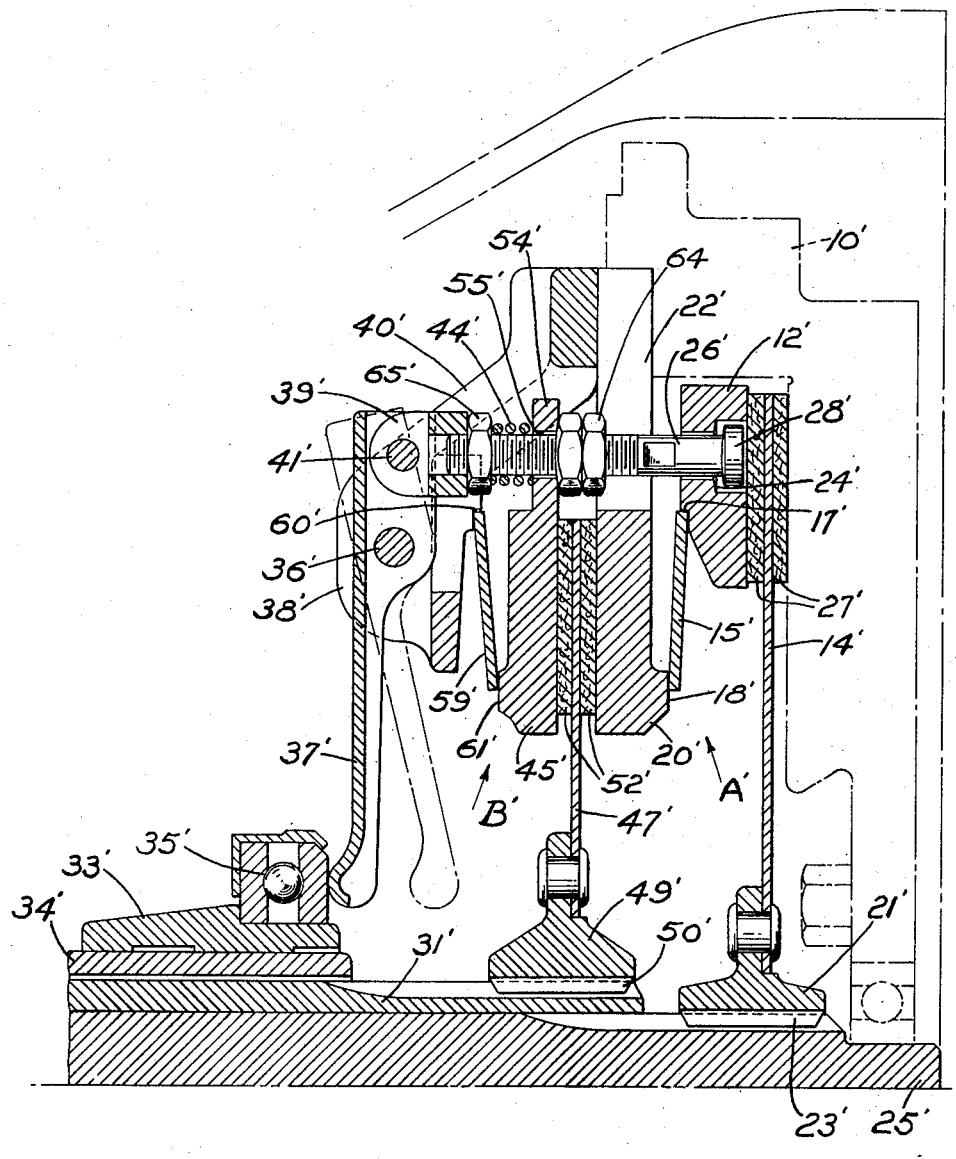
Figure 3 is a fragmentary sectional view of a clutch arrangement incorporating a modification of the structure shown in Figure 1.

To accomplish another order of disengagement and engagement however, the structure shown in Figure 3 may be used, in which two clutch assemblies indicated generally as A' and B' are adapted to be connected to a driving member 10', such as a flywheel of an engine, so that two power-take-offs may be obtained.

The clutch assembly A' comprises a pressure plate 12' and a driven member or disc 14' adapted to be frictionally engaged between the driving member 10' and the pressure plate 12' by spring means such as the Belleville washer 15'. The outer periphery of the spring washer 15' engages an annular shoulder 17' on the pressure plate 12', while the inner peripheral region of spring 15' is adapted for engagement with an annular boss 18' on an intermediate plate or abutment 20' rotatable with the driving member 10', so as to transfer the reaction load to the pressure plate 12'. Spring 15' is characterized by a negative rate so that the reaction pressure afforded thereby increases rather than decreases as a result of clutch wear, as in the previously described form, Figures 1 and 2.

The plate 20' is peripherally slotted as at 22' serving to receive locating rods or pins 26' projecting from the back of pressure plate 12', which pins 26' also serve as adjustable release rods. Shouldered apertures 24' are provided in pressure plate 12' to receive the head ends 28' of rods 26'. Torque is transmitted from flywheel 10' to pressure plate 12' by the usual drive lugs (not shown) to drive the driven disc 14' which has a central hub 21' splined at 23' on driven shaft 25' and a pair of friction facings 27' secured on opposite sides of the outer portion of the disc 14' between pressure plate 12' and flywheel 10'.

A second driven shaft 31' of tubular cross section is telescoped on shaft 25' for rotation therewith or independently thereof. Shaft 25' is preferably coupled to the transmission for driving the vehicle, while shaft 31' is coupled to an auxiliary device either on or adjacent the vehicle.

Clutch release sleeve 33' slidably reciprocated on an intermediate quill 34' surrounding tubular shaft 31' supports a thrust bearing 35' the inner race of which engages the radially inner portion of release levers 37'. The levers 37' are pivotally supported by pins 36' between rearwardly bent flanges 38' of back plate or spider 40' which like spider 40 (Fig. 1), is mounted on flywheel 10'. The radially outer portions of levers 37', are apertured to receive the pins 41' for connection to the rod end members 39'.

Clutch assembly B' comprises the intermediate plate 20' functioning as the driving member, pressure plate 45', and a driven member or disc 47'. Driven member 47' includes a hub 49' splined at 50' on tubular shaft 31' and a pair of friction facings 52' attached to the peripheral region of the disc 47' between the confronting surfaces of driving plate 20' and pressure plate 45'. Driving connection between pressure plate 45' and driving member 10' may be by means of the usual driving lugs (not shown). Another set of lugs 54' apertured at 55' to receive rods 26' has been provided.

A Belleville spring washer 59' is interposed between back plate 40' and pressure plate 45' to apply engaging pressure to the pressure plate. The periphery of the spring washer 59' engages an annular shoulder 60' on the back plate 40', while the inner peripheral region of spring 59' is adapted for engagement with an annular boss 61' on pressure plate 45'.

Lugs 54' serve as abutments against which adjustable stops 64' apply releasing pressure to the pressure plate 45'. The stops 64' comprise pairs of lock nuts which are adjustably threaded on rods 26' to locate pressure plate 54'. Rods 26' are also provided with lock or jam nuts 65' adjacent members 39'. Surrounding rods 26' and interposed between lock nuts 65' and lugs 54' are springs 44' which urge the lugs 54' against stops 64'. Springs 44' also serve to overcome the effect of centrifugal force on the inner ends of levers 37' in the same manner as springs 44. A predetermined amount of disengaging movement of release levers 37' will first release disc 47', against the action of the spring 59'. Continued movement of levers 37' to the right (Fig. 3) will engage the heads 28' of rods 26' with shouldered apertures 24' in pressure plate 12' and effect disengaging movement of pressure plate 12' against the action of spring 15'. Thus, a form of lost motion connection is provided between the pressure plates 12' and 45'. Both clutches are thereby sequentially disengaged by a single set of clutch release levers 37' and one throw-out mechanism, but in reverse order of disengagement to that described in connection with Figure 1.

Thus clutch assembly B' for coupling the engine to the auxiliary mechanism may be disengaged independently of clutch assembly A'. By this arrangement, the auxiliary mechanism driven by tubular shaft 31' may be brought to rest, while the vehicle is moving. Clutch B' may be reengaged without having disengaged clutch A'. Furthermore, further disengaging movement of a clutch pedal or lever will cause subsequent disengagement of clutch A' to stop the drive to the vehicle transmission. With this form of the invention, also, reengaging movement of clutch pedal or lever will effect engagement of clutch A' first and then clutch B' in the reverse order of their disengagement. Such order of disengagement and engagement is desirable in instances where the previously described form of the invention is not required, or preferred.

With this form of the invention either sequence of disengagement of clutches A' and B' can be obtained by adjusting locknuts 65' and stops 64'. Furthermore, the stops 64' and lock nuts 65' may be so adjusted as to provide for simultaneous disengagement and engagement of pressure plates 12' and 54' with their respective driven members. In the latter case, the clearance between heads 28' of rods 26' and shoulders 24' of pressure plate 12' will be modified.

It will be obvious that various changes in the details, which have been herein described and illustrated in order to explain the nature of the invention, may be made by those skilled in the art within the principle and scope of the invention as expressed in the appended claims.

What I claim is:

1. In a friction clutch, a first driven plate; a flywheel and a pressure plate between which said driven plate is adapted to be engaged; a clutch housing attached to the flywheel for encompassing said plates; an annular reaction plate connected to and extending radially inward from said housing in spaced relation to said pressure plate; means effecting a driving connection between said pressure plate and said reaction plate; a second driven plate; a second pressure plate between which and said reaction plate said second driven plate is adapted to be engaged; means for effecting a driving connection between said second pressure plate and said housing; telescoped driven shafts connected to the respective driven plates; spring means for urging said pressure plates into engagement with their respective driven plates; common clutch release means for the respective pressure plates including a single sleeve, a single set of release levers and a single set of release rods operating directly on said first pressure plate; and means for effecting sequential disengagement of said driven plates, said second pressure plate being released by means on said first pressure plate.

2. In a friction clutch, a first driven plate; a flywheel and a pressure plate between which said driven plate is adapted to be engaged; a housing attached to the flywheel; an annular reaction plate extending radially inward from said housing in spaced relation to said pressure plate; means effecting a driving connection between said pressure plate and said reaction plate; a second pressure plate confronting said reaction plate; a second driven plate adapted to be engaged between said reaction plate and said second pressure plate; means effecting a driving connection between said second pressure plate and said housing; telescoped driven shafts connected to the respective driven plates; a set of clutch levers pivoted intermediate their ends on said housing; an operating collar slidable axially of said driven shafts and engageable with the inner ends of said levers; release rods between the outer ends of said levers and said first pressure plate; and adjustable tappet means between said first and second pressure plates for releasing said second pressure plate upon predetermined movement of said operating collar.

3. A multiple clutch comprising a driving member; a driven shaft; a driven sleeve on said shaft adapted for rotation independently thereof; a normally engaged first clutch assembly, including a pressure plate frictionally coupling said shaft to said driving member; said pressure plate having a projection extending axially therefrom; a normally engaged second clutch assembly including a pressure plate frictionally coupling said sleeve to said driving member; said pressure plate having a projection extending radially therefrom; and means to sequentially disengage said clutch assemblies including a shift collar movable longitudinally of said sleeve, lever means actuated by said shift collar, release rods actuated by said lever means and pivotally connected to said first clutch pressure plate, and means projecting from said axial projection and engageable with said radial projection to disengage said second clutch pressure plate upon predetermined disengaging movement of said first clutch pressure plate.

4. In a friction clutch, a first driven plate; a flywheel and a first pressure plate between which said first driven plate is adapted to be engaged; an annular reaction plate in axially spaced relation to said first pressure plate; a second pressure plate alongside said reaction plate; a second driven plate between said reaction plate and second pressure plate for engagement therewith; a spring washer between said reaction plate and said first pressure plate normally urging said first pressure plate into engagement with said first driven plate; a housing in axially spaced relation to said second pressure plate; a spring normally urging said second pressure plate into engagement with said second driven plate; and means for sequentially operating the respective pressure plates including lever means for effecting disengagement of the first pressure plate and first driven plate, and tappet means associated with said first pressure plate and engageable with second pressure plate upon predetermined movement of said first pressure plate for effecting disengagement of the second pressure plate and second driven plate.

5. In a multiple clutch construction, a first clutch comprising a driven member, a pressure plate, and a reaction member; a second clutch comprising a driven member, a pressure plate, and a reaction member; individual spring washers for urging said pressure plates into engagement with their respective driven members; a single release mechanism for said pressure plates including one set of release levers and a single set of release rods connected to one of said pressure plates for directly disengaging said pressure plate from its driven member, and axially adjustable means between said pressure plates adapted upon predetermined movement of said levers to contact the other of said pressure plates to disengage said other pressure plate from its driven member.

6. In a multiple clutch construction, a first clutch comprising a driven disc, a pressure plate and a reaction member; second clutch comprising a driven disc, a pressure plate and a reaction member; individual spring washers between said pressure plates and their respective reaction members for urging said pressure plates into engagement with their respective driven discs; common release mechanism for said pressure plates including one set of release levers connected to one of said pressure plates to disengage said pressure plate from its driven disc, and tappet means projecting from said pressure plate and adapted to engage the other of said pressure plates upon predetermined movement of said levers to disengage the other of said pressure plates from its driven disc.

7. A structure according to claim 2 in which the adjustable tappet means comprises adjustable screws projecting axially from said first pressure plate and engageable with said second pressure plate upon predetermined movement of said first pressure plate.

8. A structure according to claim 2 in which the adjustable tappet means comprises adjustable stop means on said release rods engageable with said second pressure plate to effect sequential movement of said pressure plates.

References Cited in the file of this patent

UNITED STATES PATENTS

| 2,026,945 | Lane | Jan. 7, 1936 |
| 2,057,559 | De Backer | Oct. 12, 1936 |
| 2,136,049 | Hering | Nov. 8, 1938 |
| 2,237,322 | West | Apr. 8, 1941 |
| 2,367,076 | Varblow | Jan. 9, 1945 |

FOREIGN PATENTS

| 864,187 | France | Jan. 13, 1941 |
| 1,015,291 | France | July 2, 1952 |